(No Model.)
A. & L. Q. BRIN.
OZONE APPARATUS.
No. 361,923. Patented Apr. 26, 1887.
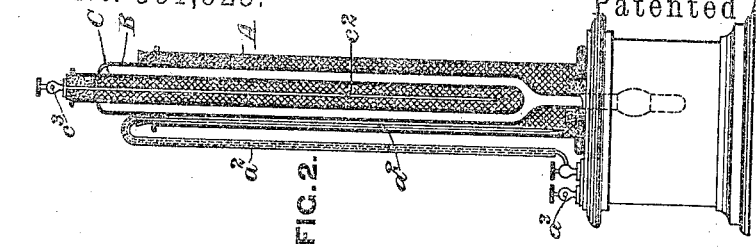
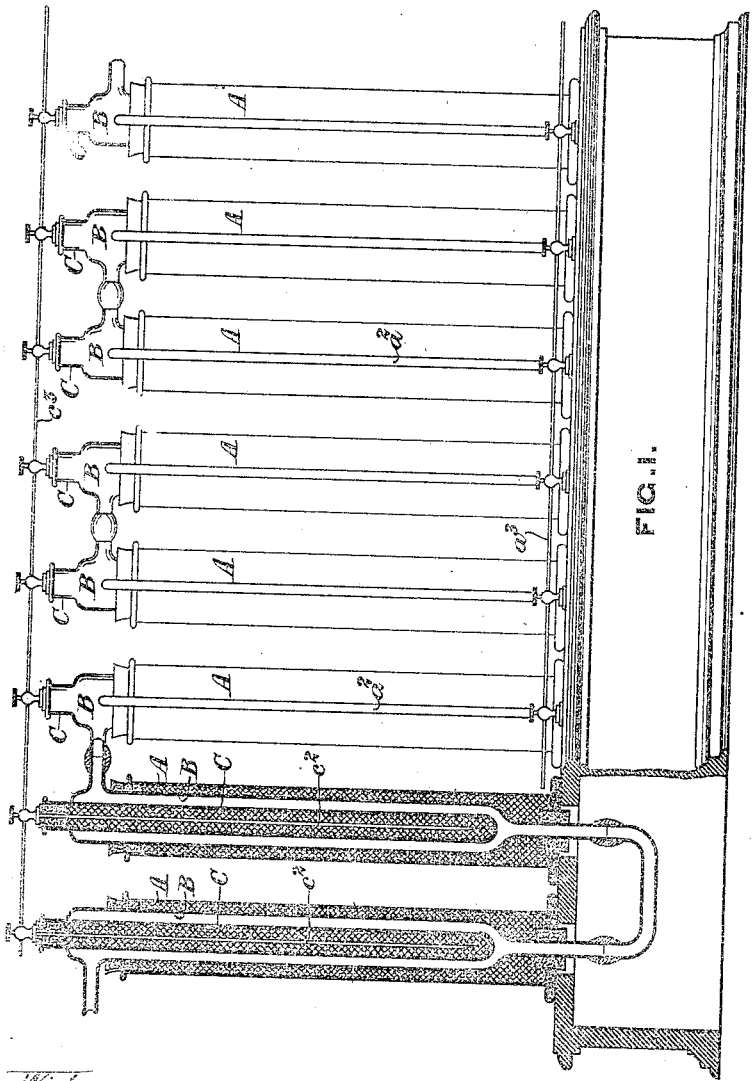
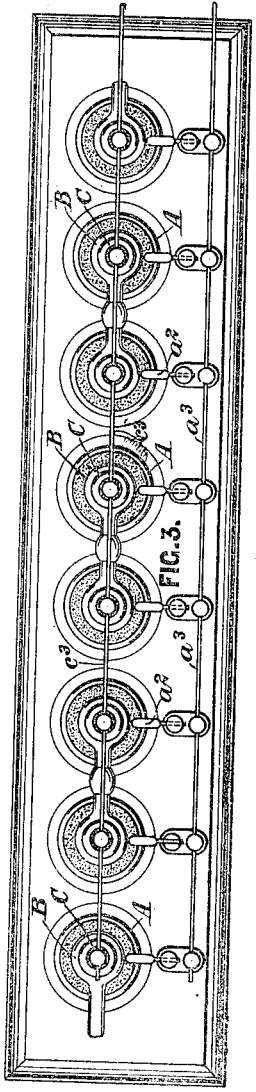
Witnesses:
Philip Mauro
C. J. Hedrick
Inventors
Arthur Brin and
Léon Quenton Brin
by A. Pollok
their attorney

UNITED STATES PATENT OFFICE.

ARTHUR BRIN, OF 59 BROMPTON CRESCENT, COUNTY OF MIDDLESEX, ENGLAND, AND LÉON QUENTIN BRIN, OF PARIS, FRANCE.

OZONE APPARATUS.

SPECIFICATION forming part of Letters Patent No. 361,923, dated April 26, 1887.

Application filed January 3, 1887. Serial No. 223,226. (No model.) Patented in England September 17, 1886, No. 11,846, and in Germany October 15, 1886.

*To all whom it may concern:*

Be it known that we, ARTHUR BRIN and LÉON QUENTIN BRIN, engineers and chemists, citizens of the Republic of France, and residing, respectively, ARTHUR BRIN at 59 Brompton Crescent, in the county of Middlesex, England, and LÉON QUENTIN BRIN at 7 Rue Gavarni, Paris, in the said Republic of France, have jointly invented certain new and useful Improvements in Means for the Manufacture or Production of Ozone, (for which we have applied for a patent in Great Britain, No. 11,846, on September 17, 1886, and for which Brin's Oxygen Company, Limited, have applied for a patent in Germany, on October 15, 1886,) of which the following is a specification.

The object of our invention is to overcome the difficulties hitherto attending the production of ozone, and to enable it to be produced or manufactured on a commercial scale and of sufficient strength for employment in the arts or for the purposes to which ozone is applicable. For this purpose we pass the electric current across or between such materials as offer isolated asperities or points or separate granules, so as to produce a large number of sparks, which pass through the oxygen or the atmospheric air under treatment. This we effect by making the passage for the oxygen or air under treatment between tubes or other containers or holders filled with or supporting granular or divided conducting material, the poles of an electric generator being so connected thereto, respectively, that the current in passing across the space between them gives a large number of small sparks playing through a large space. The tubes, containers, or supports themselves should be of a material which will not interfere with the sparking of the current. On the circuit of the electric generator being completed the sparks pass in great number and with great energy between the points or granules, or the like, across the space containing the oxygen or air, and ozone is formed, which can be drawn off and utilized as required.

We do not limit ourselves to the use of any precise construction or arrangement of apparatus in carrying our improved process into effect, nor to the precise construction and arrangement of the parts constituting our improved apparatus; but in order that our invention may be thoroughly understood we will describe, with reference to the accompanying drawings, the best means with which we are acquainted for carrying it into practical effect.

Figure 1 is a longitudinal section, and Fig. 2 a transverse section, and Fig. 3 is a plan, of the apparatus.

We employ a series of sets, each consisting of three tubes, A B C, of different diameters, placed concentrically one within the other. The center tubes, C, and the annular spaces between the outer tubes, A, and the intermediate tubes, B, contain solid matter of high conductivity in the hereinbefore-mentioned condition, such as granular plumbago, iron filings, zinc filings, or copper filings, or dust-shot. The oxygen gas or air passes through the spaces between the center tubes, C, and the intermediate tubes, B, and is most thoroughly and powerfully electrified by the sparks passing through it from the material contained in the center tubes to the material contained in the annular spaces between the outside tubes, A, and the intermediate tubes, B, or vice versa. The matters contained in the spaces between the tubes A and B and that contained in the tubes C are connected with the respective poles of any suitable electric generator—such as a dynamo-machine—producing an intermittent current. The connections with the poles of the battery are shown as being formed with regard to one pole by the conducting-rods $c^2$, inserted into the material in the tubes C and electrically connected all to one bar $c^3$ leading to the one pole of the generator, the connection with the other pole of the generator being similarly formed by the rods $a^2$, inserted into the material in the tubes A and led to binding-screws which are in electrical connection with the bar $a^3$ leading to the other pole of the generator. The annular space of each set of tubes through which the oxygen or air passes is in communication with that next to it, so that the oxygen or air passes from one to the other through the whole series, and the ozone formed escapes by the outlet from the last of the spaces.

By the means described we are able to subdivide what under ordinary conditions would be one electric spark of great length and emitted at one point into a very great number of small sparks emitted through a considerable space, which sparks, passing through the stream of oxygen gas or air, act on it so as to convert it into pure ozone of great strength where oxygen is used; but where air is acted on the produced ozone will not be so strong, but still will be useful in many important applications in medicine—for example, in producing a curative or purifying atmosphere in hospital-wards.

We claim as our invention—

1. In producing or manufacturing ozone, passing the oxygen or air from which the ozone is to be formed between layers or masses of divided or granular conducting material connected, respectively, with the poles of an electric generator, so that numerous sparks are caused to pass through the oxygen or air, in the manner specified.

2. The apparatus for the manufacture of ozone, arranged substantially as hereinbefore described, and illustrated in the accompanying drawings, the said apparatus being provided with a passage for the oxygen or air under treatment between containers or holders filled with or supporting granular or divided conducting material.

In testimony whereof we have signed our names to this specification in the presence of two subscribing witnesses.

ARTHUR BRIN.
            LÉON QUENTIN BRIN.

Witnesses:
   CHAS. MILLS,
   HENRY NEWBY,
    *Both of 47 Lincoln's Inn Fields, London.*